(12) United States Patent
Matsuo

(10) Patent No.: US 6,588,850 B2
(45) Date of Patent: Jul. 8, 2003

(54) CONSTRUCTION OF SLIDE RAIL FOR AUTOMOBILE SEAT

(75) Inventor: Takashi Matsuo, Hamamatsu (JP)

(73) Assignee: Suzuki Motor Corporation, Hamamatsu (JP)

(*) Notice: Subject to any disclaimer, the term of this patent is extended or adjusted under 35 U.S.C. 154(b) by 0 days.

(21) Appl. No.: 10/021,155

(22) Filed: Oct. 30, 2001

(65) Prior Publication Data
US 2002/0050550 A1 May 2, 2002

(30) Foreign Application Priority Data
Oct. 30, 2000 (JP) ........................................ 2000-329920

(51) Int. Cl.[7] .............................................. A47C 31/00
(52) U.S. Cl. ................ 297/473; 297/463.1; 297/344.11
(58) Field of Search .............................. 297/473, 463.1, 297/464, 344.11; 248/429, 430, 424

(56) References Cited

U.S. PATENT DOCUMENTS

| 4,483,504 A | * | 11/1984 | Duwelshoft |
| 4,729,602 A | * | 3/1988 | Tokugawa |
| 4,804,229 A | * | 2/1989 | Nishino |
| 5,137,244 A | * | 8/1992 | Negi |
| 5,915,660 A | * | 6/1999 | Kanda |

FOREIGN PATENT DOCUMENTS

| JP | 55-8957 | * | 1/1980 |
| JP | 62-18348 | * | 1/1987 |
| JP | 62-238136 | * | 10/1987 |

* cited by examiner

Primary Examiner—Laurie L. Cranmer
(74) Attorney, Agent, or Firm—Alston & Bird LLP

(57) ABSTRACT

The present invention provides a slide rail construction for an automobile seat, which can realize an increase in strength. An automobile seat has a seat back for mainly supporting the upper body of a passenger and a seat cushion for supporting the legs of the passenger. Slide rails consisting of an outer rail and an inner rail are disposed between the seat cushion and a vehicle floor. An automobile seat is slidable with respect to the vehicle floor due to the slide rails. An upper rail of the inner rail is provided with a side part attaching bracket extending upward in a substantially vertical direction and a lower part attaching bracket extending in a substantially horizontal direction. A cushion frame of the seat cushion is attached by means of both of the brackets. In front of and near the side part attaching bracket, a buckle is attached.

3 Claims, 4 Drawing Sheets

CONSTRUCTION OF SLIDE RAIL FOR AUTOMOBILE SEAT

FIELD OF THE INVENTION AND RELATED ART STATEMENT

The present invention relates to a construction of a slide rail for an automobile seat and, more particularly, to an attachment construction of a seat cushion to a slide rail.

In the case where a pair of slide rails are attached to a vehicle floor in such a manner as to be in parallel with each other, and an automobile seat is attached to the slide rails, there are available a method in which the side faces of cushion frame are attached to the slide rails, a method in which the bottom faces of cushion frame are attached to the slide rails, and other methods.

In the case where a buckle for a seat belt is attached to an inner-side slide rail, the inner-side slide rail is subjected to a tensile load applied to the buckle via the seat belt in addition to a load applied to a seat. Therefore, the inner-side slide rail requires a higher strength than an outer-side slide rail.

OBJECT AND SUMMARY OF THE INVENTION

The present invention has been made in view of the above situation, and accordingly an object thereof is to provide a construction of a slide rail for an automobile seat, which can realize an increase in strength against a tensile load.

To achieve the above object, the present invention provides a construction of a slide rail for an automobile seat, which is attached to a seat cushion of the automobile seat to hold the seat so as to be slidable with respect to a vehicle floor, wherein an attachment portion extending in two different directions is provided on a slide rail body, and a cushion frame of the seat cushion is fixed to the slide rail body via the attachment portion.

The attachment portion is made up of a first bracket which is erected upward from the slide rail body and is fixed to the side face of the cushion frame and a second bracket which extends in the substantially horizontal direction from the slide rail body and is fixed to the bottom face of the cushion frame.

A buckle for seat belt is attached to the slide rail body, and the buckle is located in front of the first and second brackets.

The slide rail body consists of an upper rail attached to the seat cushion side and a lower rail attached to the vehicle floor, and the first and second brackets are fixed to the upper rail by means of a common fixing element.

The first and second brackets are fixed with the upper rail being held therebetween.

The construction of a slide rail for an automobile seat in accordance with the present invention is characterized in that the attachment portion extending in two different directions is provided on the slide rail body, and the cushion frame of the seat cushion is fixed to the slide rail body via the attachment portion. Therefore, a load applied to the cushion frame can be transmitted surely from the attachment portion extending in two different directions to the slide rail body. Furthermore, a tensile load applied to one slide rail body can be transmitted to the cushion frame, and further from the cushion frame to the other slide rail body, so that the tensile load applied to the slide rail can be received by the whole of both slide rail bodies.

If the attachment portion is made up of the first bracket which is erected upward from the slide rail body and is fixed to the side face of the cushion frame and the second bracket which extends in the substantially horizontal direction from the slide rail body and is fixed to the bottom face of the cushion frame, since the cushion frame can be fixed surely by means of the first and second brackets, the attachment strength of the slide rail body and the seat cushion can be enhanced. Also, since the first and second brackets are formed into a so-called L shape, the attachment position in the vehicle width direction of the cushion frame can be regulated, so that the assembling ability can be improved.

If the configuration is such that the buckle for seat belt is attached to the slide rail body and the buckle is located in front of the first and second brackets, the strength can be enhanced effectively against the frontward and slantwise upward tensile load applied to the buckle.

If the slide rail body consists of an upper rail attached to the seat cushion side and a lower rail attached to the vehicle floor, and the first and second brackets are fixed to the upper rail by means of a common fixing element, the number of parts and the manpower for fabrication can be reduced as compared with the case where a separate member is used as the fixing element.

If the configuration is such that the first and second brackets are fixed with the upper rail being held therebetween, the attachment portion is in a state of a plurality of sheets being lapped on each other, so that the attachment strength of each of the first and second brackets can be improved.

DETAILED DESCRIPTION OF PREFERRED EMBODIMENTS

An embodiment of a construction of a slide rail for an automobile seat in accordance with the present invention will now be described with reference to the accompanying drawings. A construction of a slide rail for an automobile seat in accordance with a first embodiment of the present invention will be explained using FIGS. 1 to 6.

Figure 1:
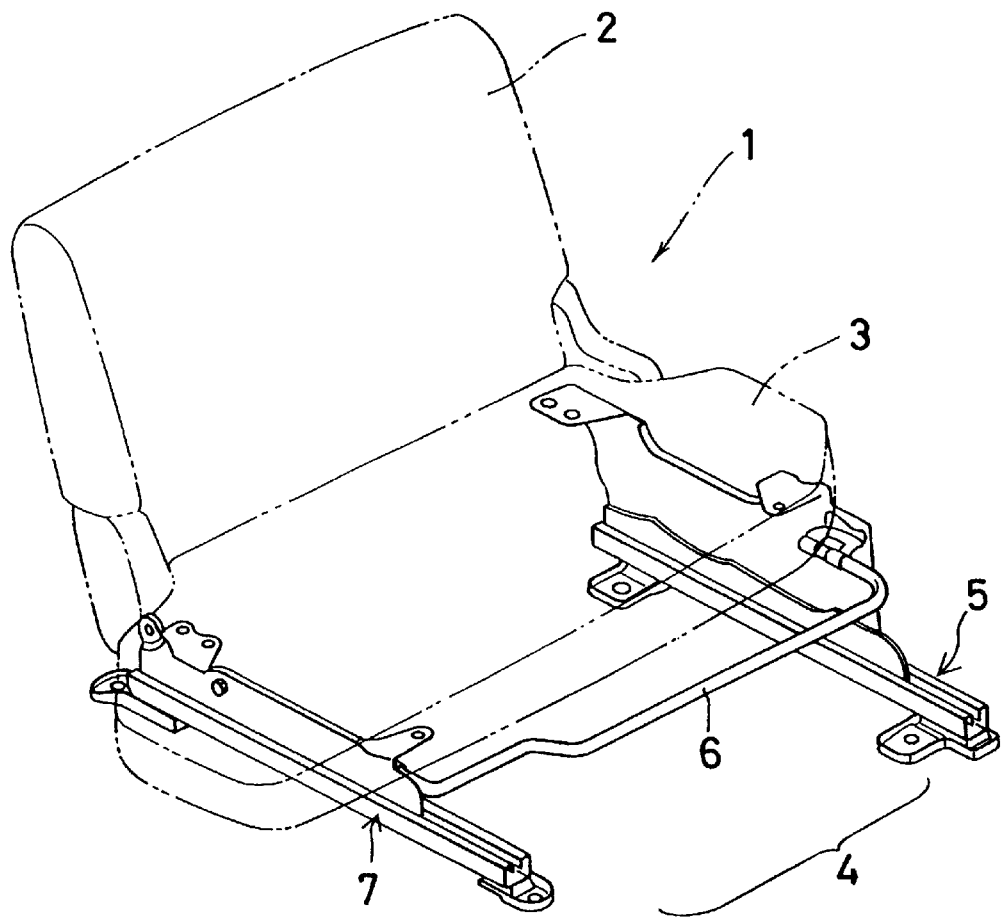
FIG. 1 is a perspective view of a seat to which a construction of a slide rail for an automobile seat in accordance with one embodiment of the present invention is applied.
Figure 2:
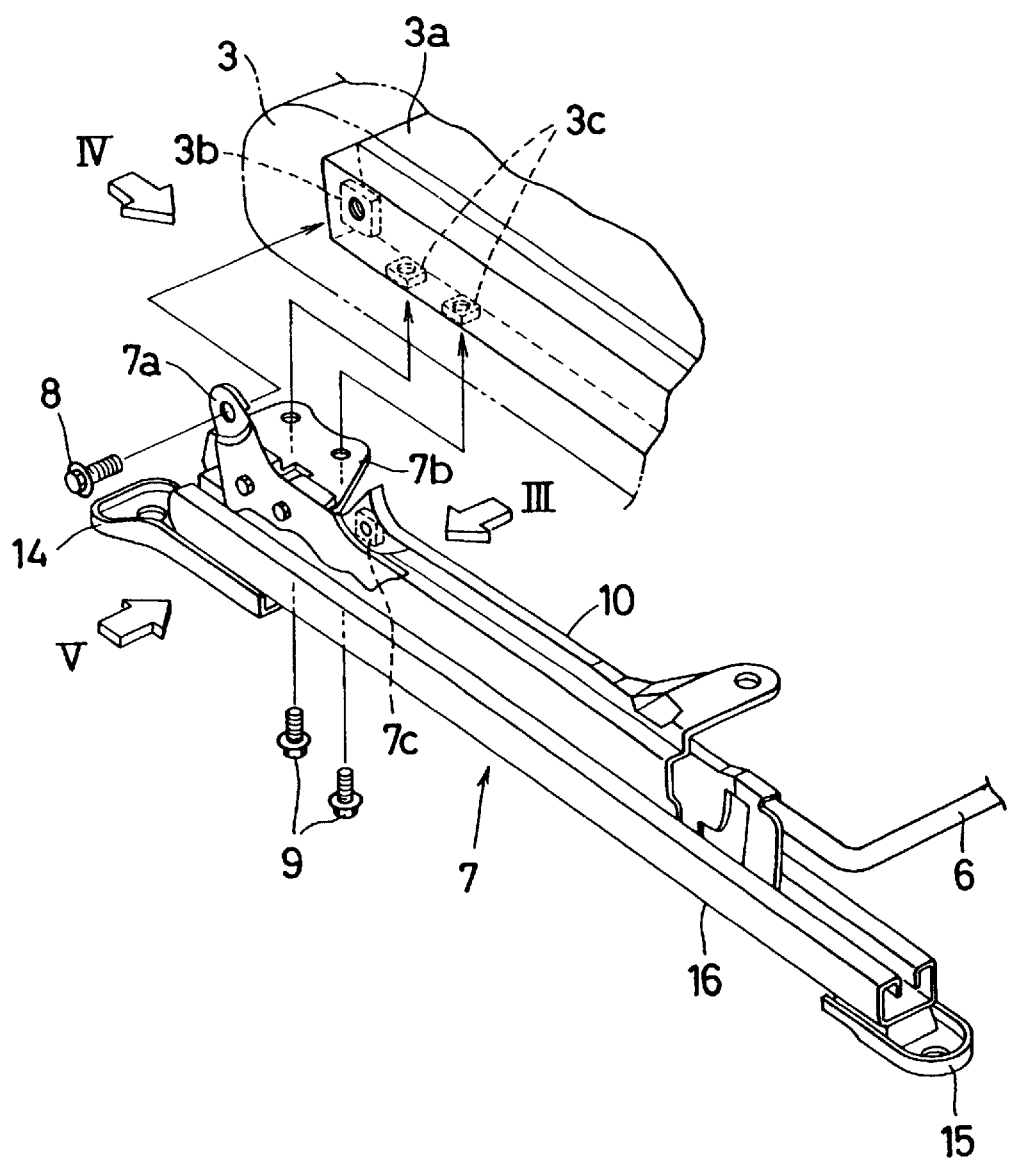
FIG. 2 is a perspective view partially showing the construction of a slide rail for an automobile seat shown in FIG. 1.

As shown in FIG. 1, an automobile seat 1 has a seat back 2 for mainly supporting the upper body of a passenger and a seat cushion 3 for supporting the legs of the passenger. Slide rails 4 are disposed between the seat cushion 3 and a vehicle floor so that the seat cushion 3 is slidable with respect to the vehicle floor due to the slide rails 4. The slide rails 4 consist of an outer rail 5 disposed on the vehicle side wall side and an inner rail (slide rail body) 7 disposed on the vehicle center side. The outer rail 5 and the inner rail 7 each include an upper rail 10 attached to the seat cushion side and a lower rail 16 attached to the vehicle floor. The upper rails 10 are connected to each other by a lever 6 extending in the vehicle width direction so as to be moved in association with each other. As shown in FIG. 2, the lower rail 16 is attached to the vehicle floor at a rear-side floor attachment portion 14 and a front-side floor attachment portion 15.

As shown in FIG. 2, at the rear part (back side in the figure) of the inner rail 7, one side part attaching nut 3b is provided on the side face of a cushion frame 3a, which is a structural member for the seat cushion 3, and two lower part attaching nuts 3c are provided on the lower face of the cushion frame 3a. Also, at the rear part of the inner rail 7, a side part attaching bracket 7a is erected so as to extend upward, and a lower part attaching bracket 7b is provided so as to extend in the substantially horizontal direction from the inner side face of the side part attaching bracket 7a. Thus, after the cushion frame 3a is set to a substantially L-shaped corner portion formed by the side part attaching bracket 7a and the lower part attaching bracket 7b of the inner rail 7, the side part attaching bracket 7a and the side part attaching nut 3b are threadedly engaged with each other by means of a bolt 8, and the lower part attaching bracket 7b and the lower part attaching nuts 3c are threadedly engaged with each other by means of bolts 9. Thereby, the upper rail 10 is fixed to the seat cushion 3. In front of (front side in the figure) and near the side part attaching bracket 7a of the inner rail 7, a buckle attaching nut 7c is provided.

Figure 3:
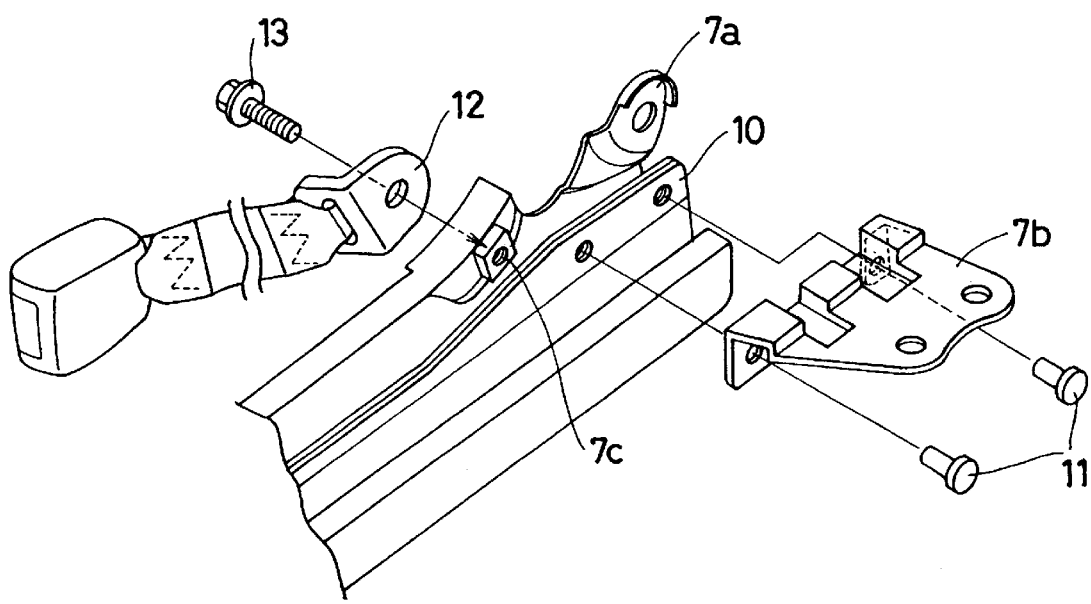
FIG. 3 is an exploded perspective view taken in the direction of arrow III of FIG. 2.
Figure 4:
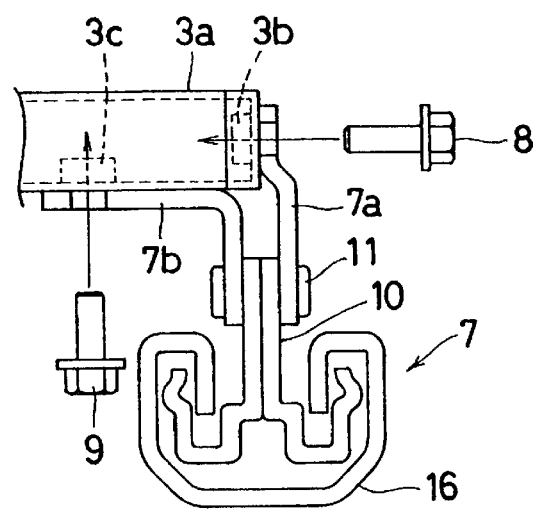
FIG. 4 is an end view taken in the direction of arrow IV of FIG. 2.

As shown in FIGS. 3 or 4, the side part attaching bracket 7a and the lower part attaching bracket 7b are fixed by using a caulking pin 11 inserted in a state of the upper rail 10 being held therebetween. Also, as shown in FIG. 3, to the buckle attaching nut 7c provided in front of the side part attaching bracket 7a, a buckle 12 is fixed by a bolt 13. Thus, the cushion frame 3a is attached to the inner rail 7 as shown in FIG. 4.

Figure 5:
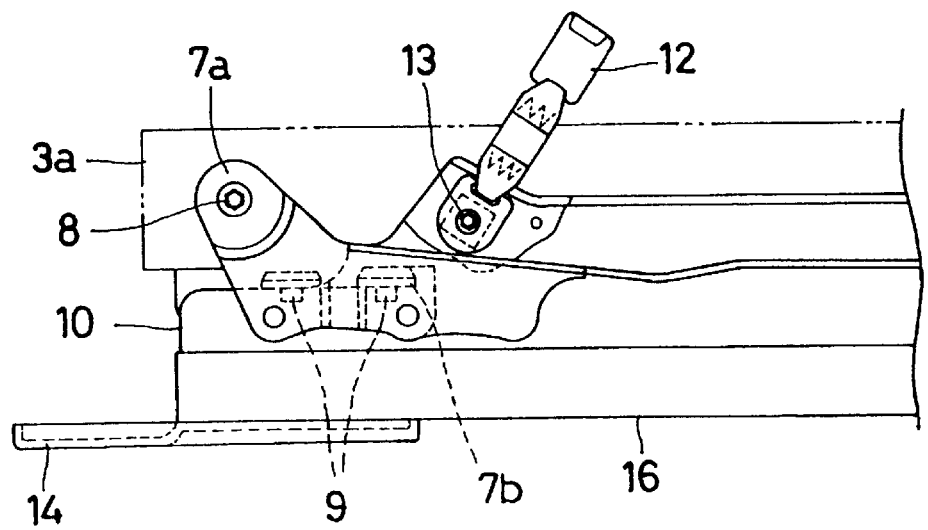
FIG. 5 is a side view taken in the direction of arrow V of FIG. 2.

Also, as shown in FIG. 5, the side part attaching bracket 7a and the lower part attaching bracket 7b are disposed at the rear of the attachment portion of the buckle 12 as an attachment portion in two different directions.

Figure 6:
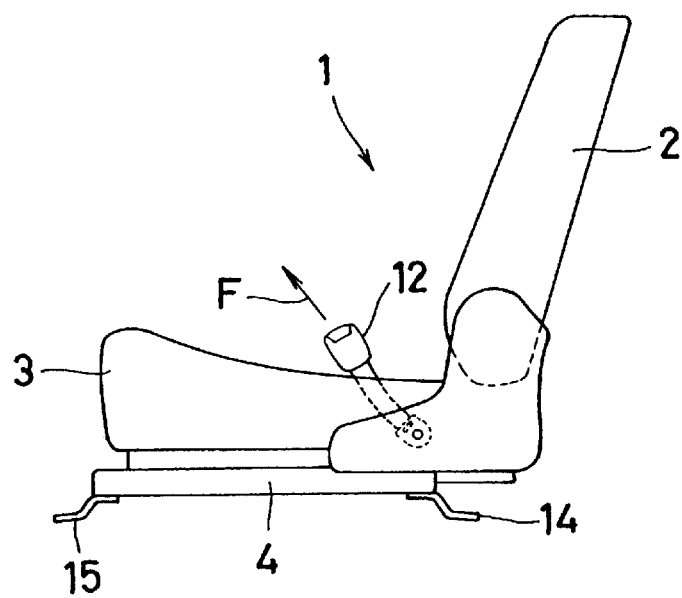
FIG. 6 is a side view of the seat shown in FIG. 1.

This embodiment, which uses the above-described construction, has an operation described below. When a frontward load is applied to the passenger, the seat belt is pulled forward, so that a load in the direction indicated by an arrow F is applied to the buckle 12 as shown in FIG. 6. Conventionally, this load has been distributed to the vehicle floor mainly through the rear-side floor attachment portion 14 (see FIG. 5) of the inner rail. According to the construction of this embodiment, by attaching the cushion frame 3a in the two directions via the brackets 7a and 7b, the tensile load from the buckle 12 can be distributed surely to the cushion frame 3a via the brackets 7a and 7b. Furthermore, the load is transmitted from the cushion frame 3a to the outer rail 5 (see FIG. 1), so that the load applied to the buckle 12 can be received by the whole of the slide rails 4, that is, by both of the outer rail 5 and the inner rail 7.

Also, since the side part attaching bracket 7a and the lower part attaching bracket 7b are provided at the rear of the buckle 12 (see FIG. 5), the strength of the inner rail 7 can be enhanced effectively against the frontward and slantwise upward load (in the direction indicated by an arrow F) applied to the buckle 12.

Also, as shown in FIG. 4, since the side part attaching bracket 7a and the lower part attaching bracket 7b are fixed to the two-ply upper rail 10 by using the common caulking pin 11, the four-ply attachment portion can more increase the attachment strength of each bracket. Also, the number of parts and the manpower for fabrication can be reduced as compared with the case where each of the side part attaching bracket 7a and the lower part attaching bracket 7b is provided with an attachment element to the upper rail 10.

Furthermore, since the side part attaching bracket 7a and the lower part attaching bracket 7b form the corner portion by the faces substantially at right angles to each other, if the cushion frame 3a is set in this corner portion, the attachment position in the vehicle width direction of the cushion frame 3a can be regulated, so that the assembling ability can be improved.

As described above, according to the construction of this embodiment, when the cushion frame 3a is attached to the inner rail 7 to which the buckle 12 is attached, the cushion frame 3a is attached in the two different directions, so that the load applied to the buckle 12 can be distributed effectively to the cushion frame 3a, and the strength of the slide rails 4 can be increased. Also, an attachment construction of the slide rails 4 to the cushion frame 3a, which has high strength and improved assembling ability, can be provided without an increase in the number of parts and the manpower for fabrication.

Although the side part attaching bracket 7a is fixed at one location and the lower part attaching bracket 7b is fixed at two locations in this embodiment, the number of fixing locations can be changed according to the necessary strength. Also, although the case where the present invention is applied to the inner rail 7 has been described in this embodiment, the present invention can be applied to the outer rail 5 in the same way.

What is claimed is:

1. A slide rail construction for an automobile seat, which is attached to a seat cushion of the automobile seat to hold said seat so as to be slidable with respect to a vehicle floor, comprising:
   a slide rail body,
   a cushion frame for said seat cushion fixed to said slide rail body via an attachment portion on said slide rail body, said attachment portion comprising a first bracket which is erected upward from said slide rail body and is fixed to a side face of said cushion frame and a second bracket which extends in a direction substantially horizontal to said slide rail body and is fixed to a bottom face of said cushion frame, and
   a buckle for a seat belt attached to said slide rail body and located in front of said first and second brackets.

2. A slide rail construction for an automobile seat, which is attached to a seat cushion of the automobile seat to hold said seat so as to be slidable with respect to a vehicle floor, comprising:
   a slide rail body, and
   a cushion frame for said seat cushion fixed to said slide rail body via an attachment portion, said attachment portion comprising a first bracket which is erected upward from said slide rail body and is fixed to a side face of said cushion frame and a second bracket which extends in a direction substantially horizontal to said slide rail body and is fixed to a bottom face of said cushion frame,
   wherein said slide rail body comprises an upper rail for attachment to a side of said seat cushion and a lower rail for attachment to the vehicle floor, and wherein said first and second brackets are fixed to said upper rail by means of a common fixing element.

3. The slide rail construction for an automobile seat according to claim 2, wherein said first and second brackets are fixed with said upper rail being held therebetween.

* * * * *